(12) United States Patent
Dhillon et al.

(10) Patent No.: US 10,118,559 B2
(45) Date of Patent: Nov. 6, 2018

(54) INTERIOR CARGO MANAGEMENT DIVIDER SYSTEM

(71) Applicant: ABC Group Inc., Toronto, ON (CA)

(72) Inventors: Kulbir Singh Dhillon, Caledon (CA); Anthony Francis Chua, Weston, CA (US); Christopher Lloyd Wright, Weston (CA); Amanda Ruscica, Weston (CA)

(73) Assignee: ABC GROUP INC., Toronto (CA)

( * ) Notice: Subject to any disclaimer, the term of this patent is extended or adjusted under 35 U.S.C. 154(b) by 0 days.

(21) Appl. No.: 15/325,967

(22) PCT Filed: Jul. 14, 2015

(86) PCT No.: PCT/CA2015/050657
§ 371 (c)(1),
(2) Date: Jan. 12, 2017

(87) PCT Pub. No.: WO2016/008046
PCT Pub. Date: Jan. 21, 2016

(65) Prior Publication Data
US 2017/0158141 A1   Jun. 8, 2017

Related U.S. Application Data

(60) Provisional application No. 62/024,930, filed on Jul. 15, 2014.

(51) Int. Cl.
*B60R 5/04* (2006.01)

(52) U.S. Cl.
CPC ............... *B60R 5/045* (2013.01); *B60R 5/04* (2013.01)

(58) Field of Classification Search
CPC ... B60R 5/045; B60R 7/02; B60R 5/04; B60P 7/14
USPC .............. 296/37.8, 37.13, 37.16, 24.4, 24.43
See application file for complete search history.

(56) References Cited

U.S. PATENT DOCUMENTS

| | | | |
|---|---|---|---|
| 4,502,674 A * | 3/1985 | White | B60R 5/047 160/121.1 |
| 5,598,962 A | 2/1997 | Schlachter | |
| 6,732,895 B2 | 5/2004 | Poliquin et al. | |

(Continued)

FOREIGN PATENT DOCUMENTS

| | | |
|---|---|---|
| FR | 2 937 923 | 5/2010 |
| JP | 2008-087625 | 4/2008 |
| KR | 1019990005055 | 2/1999 |

OTHER PUBLICATIONS

International Search Report and Written Opinion, dated Nov. 24, 2015 in International Application No. PCT/CA2015/050657.

*Primary Examiner* — Gregory A Blankenship
(74) *Attorney, Agent, or Firm* — Medler Ferro Woodhouse & Mills PLLC

(57) ABSTRACT

A cargo management system for a vehicle is disclosed. The cargo management system comprises at least one panel assembly having a first and second panel, the first and second panel being articulable about at least one hinge situated therebetween. The first panel has an attachment end for engagement with an interior trim panel of the vehicle, and the second panel has a latch end for latching and/or locking the panel assembly in a desired configuration. The panel assembly is configured to be folded when stowed, and recessed within the interior trim panel.

13 Claims, 7 Drawing Sheets

(56) References Cited

U.S. PATENT DOCUMENTS

| | | | | |
|---|---|---|---|---|
| 6,863,328 B2* | 3/2005 | Kiester | ................. | B62D 33/08 |
| | | | | 296/24.4 |
| 7,731,260 B2* | 6/2010 | Heller | ................ | B62D 33/0273 |
| | | | | 296/24.4 |
| 8,475,904 B2* | 7/2013 | Hawkins | ................... | B32B 1/00 |
| | | | | 296/37.14 |
| 2003/0057724 A1* | 3/2003 | Inagaki | ............... | B60N 2/3013 |
| | | | | 296/37.8 |
| 2003/0184107 A1* | 10/2003 | Hapspel | ................... | B60R 5/04 |
| | | | | 296/24.4 |
| 2004/0050889 A1* | 3/2004 | Shafer, Jr. | ............... | B60R 5/045 |
| | | | | 224/403 |
| 2006/0022479 A1* | 2/2006 | Mulvihill | .................. | B60R 7/02 |
| | | | | 296/37.16 |
| 2006/0181101 A1* | 8/2006 | Reynolds | .................. | B60R 7/02 |
| | | | | 296/37.8 |
| 2011/0148134 A1* | 6/2011 | Gerhardt | ................ | B60P 3/423 |
| | | | | 296/24.43 |
| 2012/0261935 A1* | 10/2012 | Perez | ....................... | B60R 5/04 |
| | | | | 296/24.4 |
| 2013/0320694 A1* | 12/2013 | Dinger | ..................... | B60R 5/04 |
| | | | | 296/37.16 |
| 2015/0283949 A1* | 10/2015 | V | ....................... | B60R 13/0268 |
| | | | | 296/24.43 |
| 2016/0375836 A1* | 12/2016 | Bathelier | ................. | B60R 7/02 |
| | | | | 296/24.4 |
| 2017/0158141 A1* | 6/2017 | Dhillon | .................. | B60R 5/045 |

* cited by examiner

INTERIOR CARGO MANAGEMENT DIVIDER SYSTEM

FIELD OF THE INVENTION

The present invention relates to the field of cargo management systems, and in particular to a deployable cargo management system incorporated into the rear interior trim panel of the cargo compartment of a vehicle.

BACKGROUND

Passenger vehicles are generally provided with a cargo compartment towards the rear section of the vehicle. The cargo compartment provides a volume of space suitable for transport of a wide range of cargo elements, such as groceries and sporting goods. Placement of goods within this space can be problematic in respect to both movement of the goods during transport, as well as accessibility. For example, in some SUV-type vehicles, goods that displace forwardly towards the rear passenger seats may be difficult for some people to reach without actually climbing into the cargo compartment. Effective cargo management not only provides a means to reduce the likelihood of damage of goods being transported, but also has the potential to reduce injury to vehicle occupants arising from unwanted movement of such goods during driving events.

SUMMARY OF THE INVENTION

According to an embodiment, provided is a cargo management system for a vehicle. The cargo management system comprises at least one panel assembly having a first and second panel, the first and second panel being articulable about at least one hinge situated therebetween. The first panel has an attachment end for engagement with an interior trim panel of the vehicle. The second panel has a latch end for latching and/or locking the panel assembly in a desired configuration. The panel assembly is configured to be folded when stowed, and recessed within the interior trim panel.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology as applied to automotive cargo compartments, it will be appreciated that the technology may be used in other applications, for example within cargo compartments of marine-craft and/or aircraft. Furthermore, there is no intention to be bound by any expressed or implied theory presented in the preceding technical field, brief summary or the following detailed description.

Figure 1:
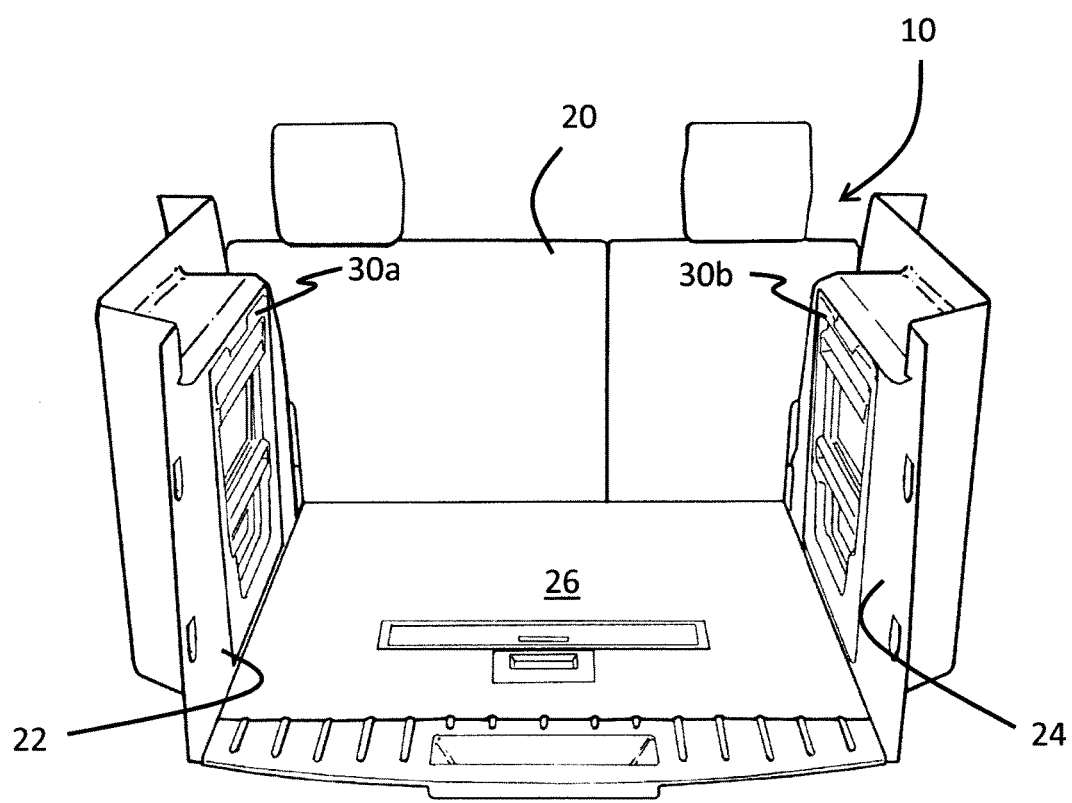
FIG. 1 is a rear perspective view of a cargo compartment of a vehicle, showing the cargo management system in the fully stowed position.

Turning now to FIG. 1, shown is an exemplary cargo compartment 10 of a sport utility vehicle (SUV). Cargo compartment 10 is generally located towards the rearward area of the vehicle, and as presented here, is largely defined by a rearmost (e.g. $2^{nd}$ or $3^{rd}$ row) passenger seat 20, a tailgate (not shown for clarity), first and second interior trim panels 22, 24, and a load floor 26.

Figure 2:
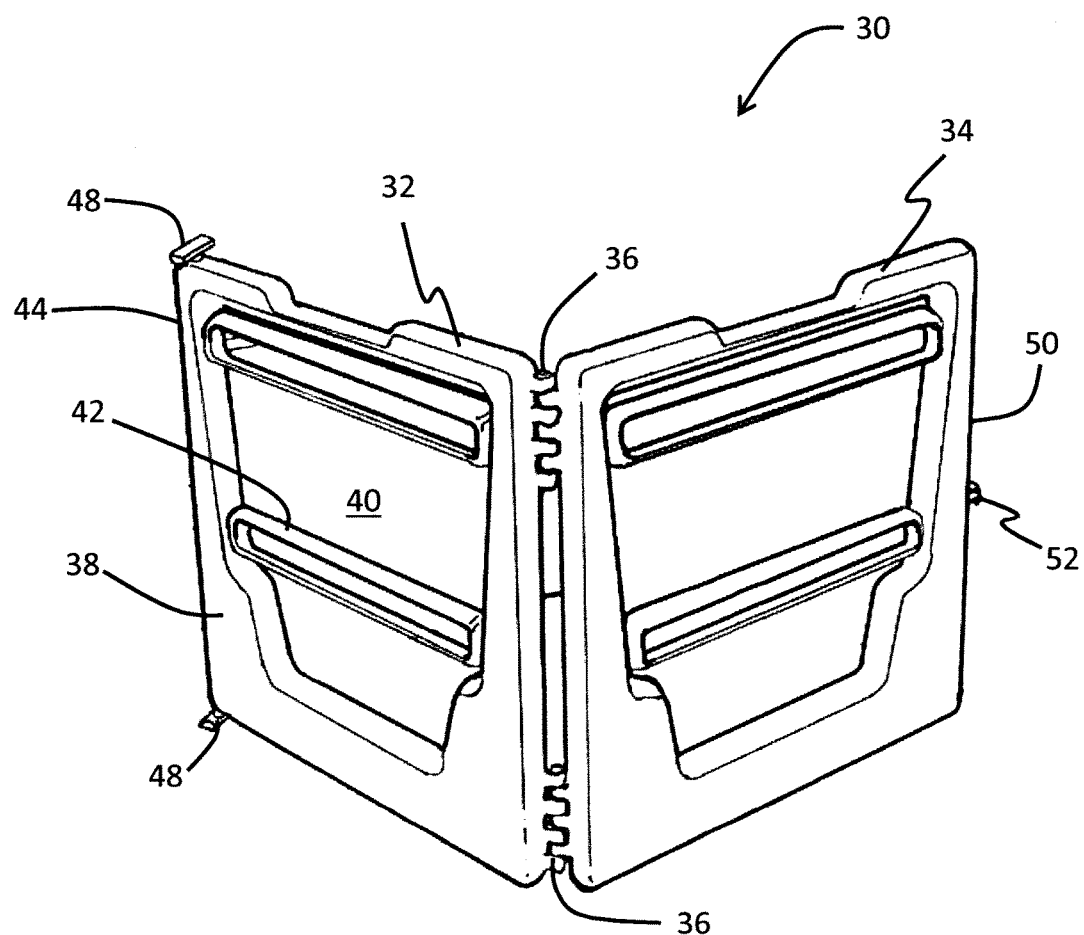
FIG. 2 is a perspective view of a panel assembly shown in isolation to illustrate features thereof.
Figure 7:
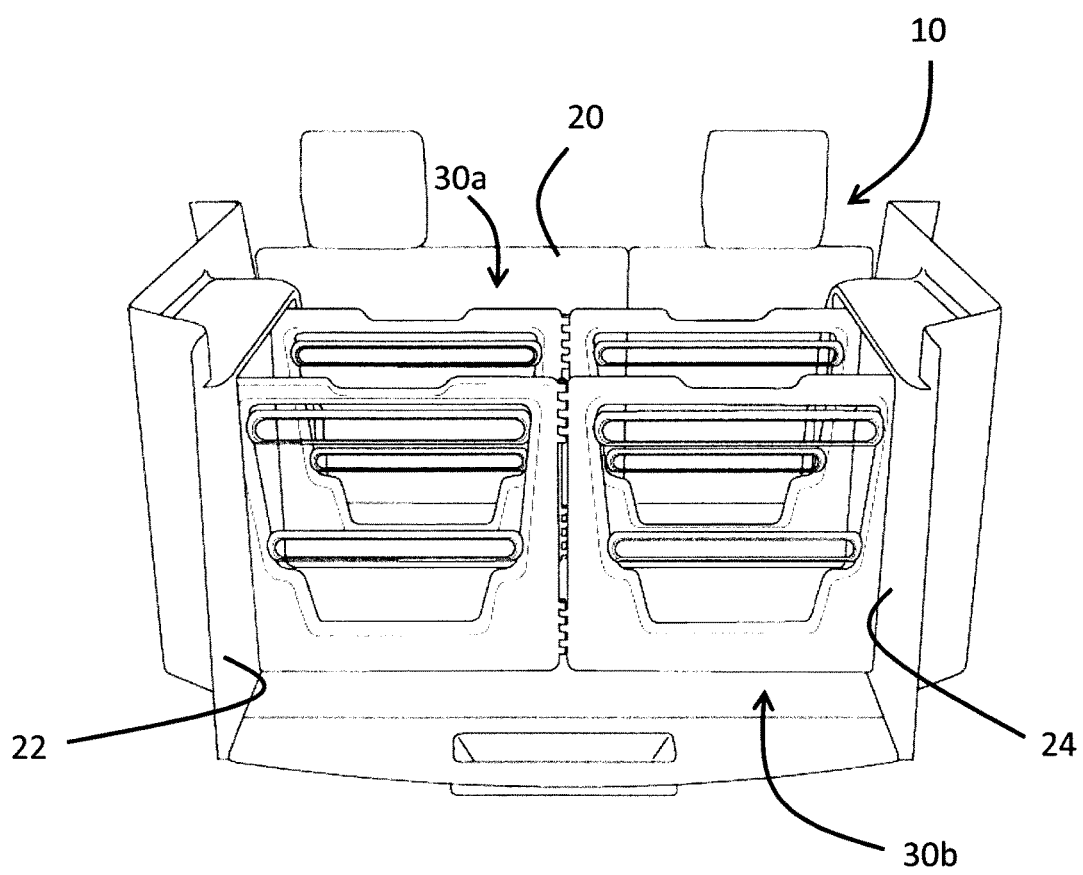
FIG. 7 shows an exemplary deployment configuration, where both left and right panel assemblies are fully extended, arranged in a twin panel configuration.

Cargo compartment 10 incorporates a panel assembly which is integrated into at least one of the first and second interior trim panels 22, 24. As noted, interior trim panel 22 includes left panel assembly 30a, while interior trim panel 24 includes right panel assembly 30b (herein collectively referred to as panel assembly 30, unless specified otherwise). As shown in FIG. 2, each panel assembly 30 includes a first panel member 32 and a second panel member 34, with first and second panel members 32, 34 being interconnected via one or more suitable hinges 36. As shown, first and second panel members 32, 34 are configured to articulate relative to each other about hinge 36 through a range of positions, including but not limited to a fully folded configuration (as shown in FIG. 1), through to a fully extended configuration as shown in the twin-panel arrangement of FIG. 7.

As will be appreciated, first and second panel members 32, 34 may be shaped in a variety of ways, and will generally present as a planar square or rectangular panel. In the embodiment shown, each panel member 32, 34 is formed with a peripheral frame 38 and a central cut-out region 40. Within region 40 are positioned one or more cross-elements 42, where such cross-elements 42 are generally positioned to obstruct objects from passing therethrough. Cross-elements 42 may be simple cross-bars, or may be formed to incorporate functional convenience elements, such as but not limited to hooks, retainers, a roll-out trunk cover, a retractable cargo net, etc. Cross-elements, in particular features such as roll-out covers may be configured to cooperate with hooks or retainers on opposing cross-elements or other receiving surfaces (e.g. rear side of passenger seats).

Figure 3:
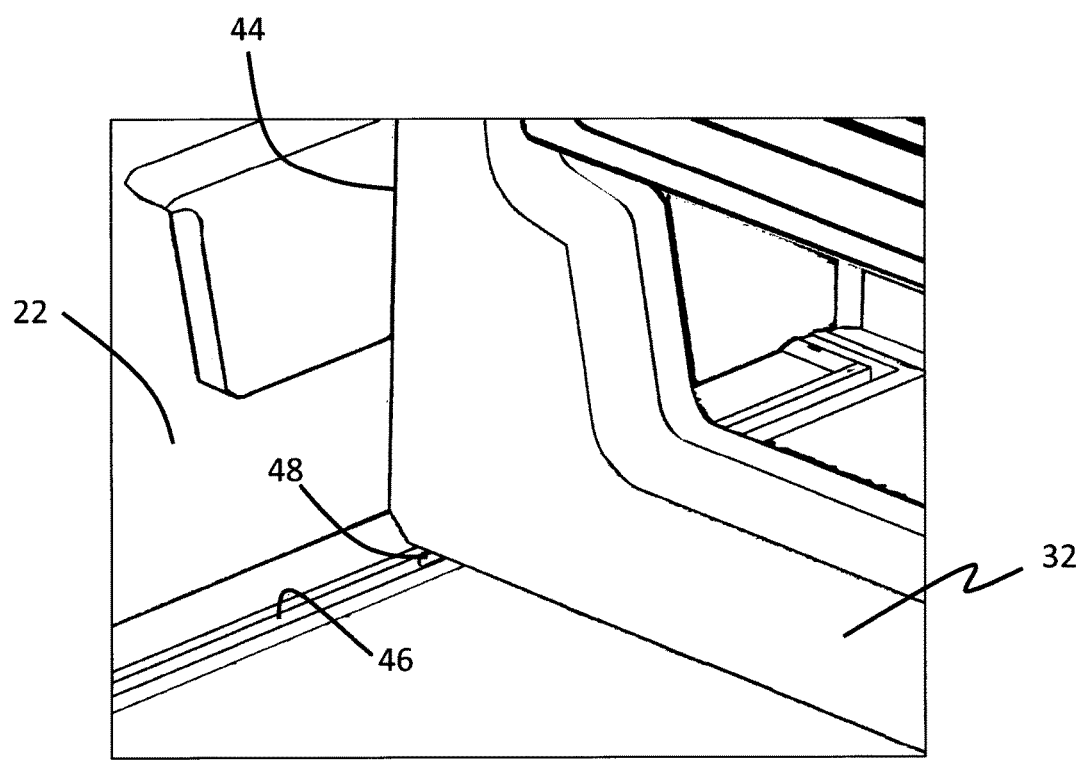
FIG. 3 is a partial close-up view of the attachment end of the panel assembly, showing engagement with a track provided on the interior trim panel.

Panel assembly 30, and in particular first panel 32 is configured along attachment end 44 with suitable hardware to allow sliding of attachment end 44 within a track 46 (see FIG. 3). For example, attachment end 44 may be provided with suitable slide pins 48 that securely retain attachment end 44 within track 46, yet permits for a sliding relationship therein. In this way, attachment end 44 may be located at any position along track 46. Attachment end 44 may further include a suitable locking feature (not shown) to retain attachment end 44 at a select location in track 46.

Continuing with panel assembly 30, second panel 34 is configured along latch end 50 with suitable hardware to permit second panel 34 to releaseably lock into a fixed position during deployment. For example, latch end 50 may be provided with a suitable latch mechanism 52 that engages and retains latch end 50 in a select location, for example against a rear surface of the rearmost passenger seat, or against the opposing interior trim panel. The latch mechanism 52 may be configured in such a manner so as to cooperate with a receiving latch receptacle, for example provided on the rear surface of the rearmost passenger seat, or may be configured with a latch mechanism (not shown) that cooperates with track 46 provided in each interior trim panel 22, 24.

As will be appreciated, the aforementioned hardware used on first and second panels 32, 34 to permit for sliding and/or latching of panel assembly 30 may take on a variety of forms. There is no intention to limit the invention to the use of any one particular form of hardware.

Figure 4A:
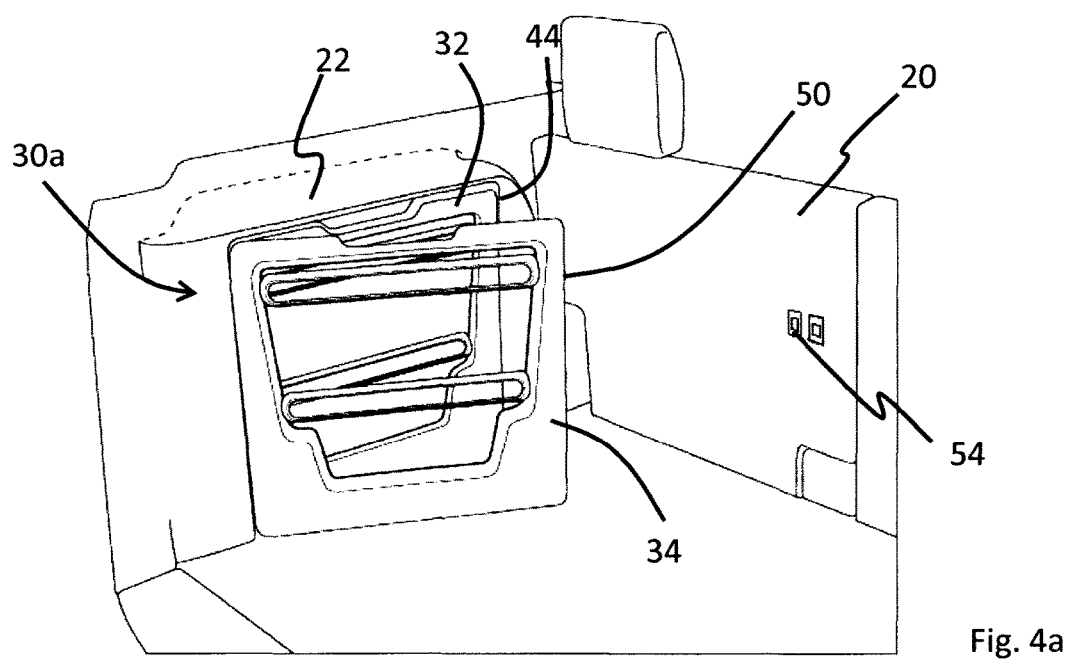
FIGS. 4a and 4b show the left panel assembly at intermediate positions during deployment.
Figure 4B:
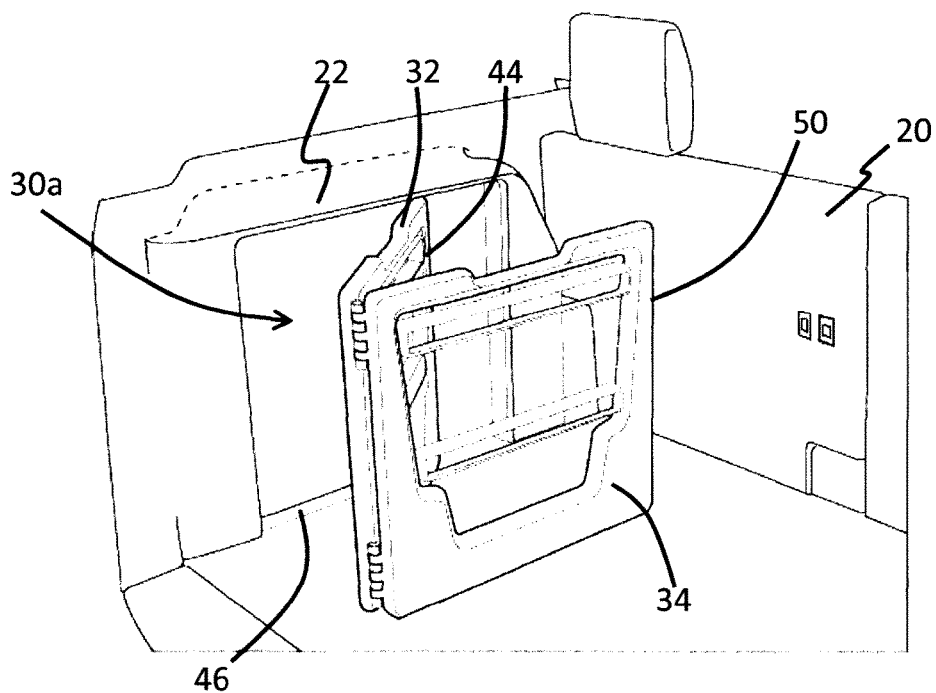
Figure 5:
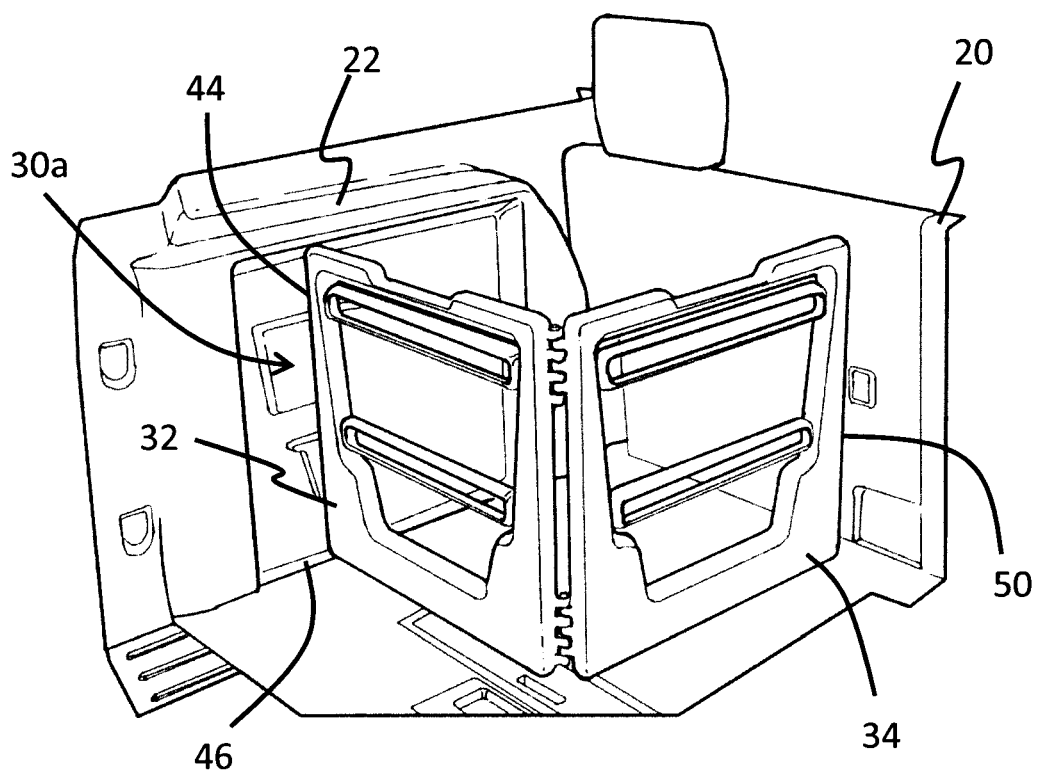
FIG. 5 shows the left panel assembly fully deployed in an L-shaped configuration.

From the stowed position (as seen in FIG. 1), deployment generally occurs by way of the following sequence. First, as shown in FIG. 4a (having regard to left panel assembly 30a), latch end 50 is released and swung outwardly from interior trim panel 22. Once released, first and second panels 32, 34 may articulate relative to each other towards the desired configuration. During this motion, attachment end 44 of first panel 32 may be slid through track 46, as detailed in FIG. 4b. Articulation and positioning of panel assembly 30a continues until the selected configuration is achieved, for example the L-shaped arrangement shown in FIG. 5. As mentioned earlier, the selected configuration may be maintained by way of engaging latch end 50 with a suitable feature, in this case a receiving latch receptacle 54 provided on the rear surface of rearmost passenger seat 20.

Figure 6:
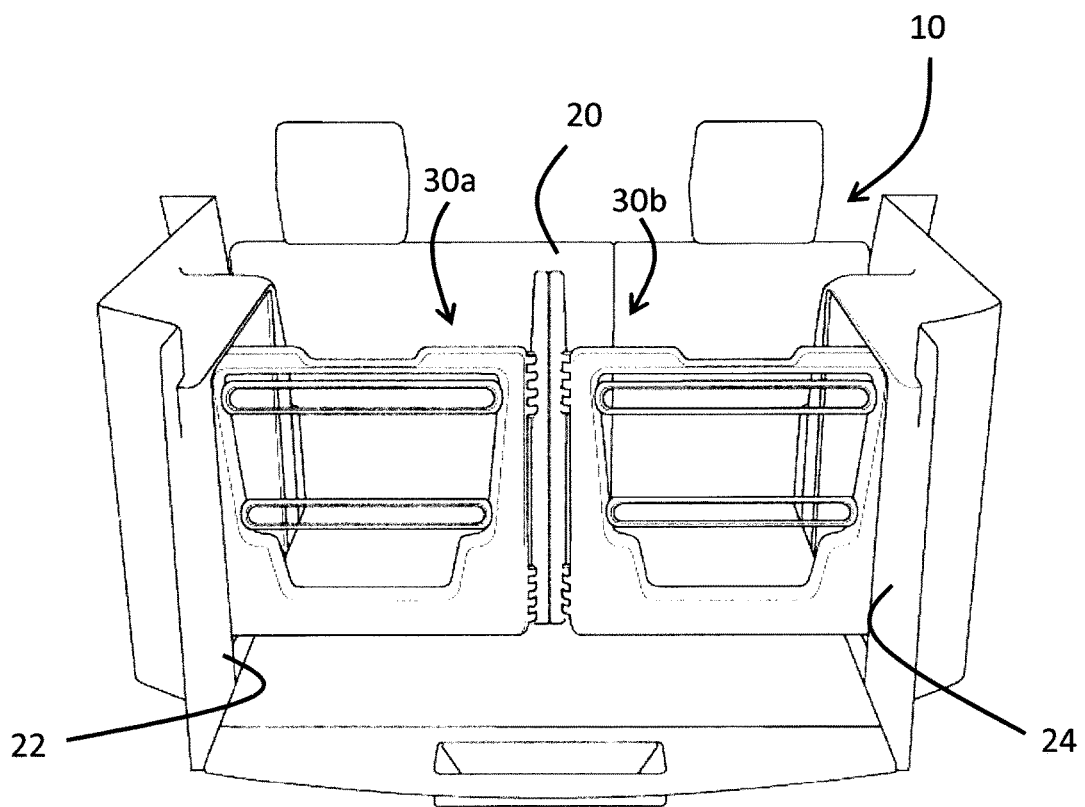
FIG. 6 shows an exemplary deployment configuration, where both left and right panel assemblies are arranged in an L-shaped configuration.

Returning now to FIG. 1, the vehicle is shown to include a cargo management system incorporating a first and second panel assembly 30a, 30b, one provided for each of first and second interior trim panels 22, 24, respectively. First and second panel assemblies 30a, 30b operate in the same manner, and may be used cooperatively to define a variety of storage configurations. Exemplary arrangements include 1) FULLY STOWED (FIG. 1)—first and second panel assemblies 30a, 30b are recessed fully in respective interior trim panels 22, 24. Interior trim panels 22, 24 may be formed with suitable recesses to receive the panel assemblies, thereby presenting a generally flush profile in the fully stowed position; 2) L-SHAPED/ONE PANEL ASSEMBLY (FIG. 5)—panel assembly 30a is deployed in an L-shaped configuration; cargo management system may cooperate with fold-down rear seats to permit for transport of elongate articles (i.e. skis, lumber, etc.); although left panel assembly 30a is shown to be deployed, the right panel assembly 30b may be similarly independently deployed; 3) L-SHAPED/ BOTH ASSEMBLIES (FIG. 6)—left and right panel assemblies 30a, 30b both deployed in an L-shaped configuration; and 4) FULL EXTENSION/BOTH ASSEMBLIES (FIG. 7)—panel assemblies 30a, 30b are both deployed in fully extended positions; panel assemblies may be located at user selected positions by virtue of sliding relationship between panel assemblies and respective tracks, thereby enabling customizable cargo compartments. Accordingly, goods for transport may be suitably located within cargo compartment 10 to improve accessibility, as well as to reduce the likelihood of movement during transport. In particular, the reduction in unwanted movement of goods by virtue of the customizable cargo compartments has the potential to reduce overall damage, as well as passenger injury arising from unwanted displacement of goods during driving events, such as hard breaking.

Panel assembly 30 may be manufactured in a variety of ways, including but not limited to blow-molding and injection molding. Where panel assembly is formed using blow-molding, each panel may be a single unitary structure. Associated hardware and cross-elements (if provided) may be incorporated either through insertion molding, or through a suitable a post-mold installation operation. If injection molded, each panel may be formed as two half-shells, and fused together in a post-mold assembly operation. Once again, associated hardware and cross-elements (if provided) may be suitably positioned during post-mold assembly. Suitable materials will include those compatible with the chosen manufacturing methodology. A non-limiting example of suitable materials includes polypropylene, polyethylene, acrylonitrile butadiene styrene (ABS), polycarbonate-acrylonitrile butadiene styrene (ABS/PC), polyamide, polylactic acid (PLA) and polyphenylene sulfide (PPS). To meet desired strength and rigidity requirements, the thermoplastic may additionally include a range of inorganic filler components, a non-limiting example of which includes glass, mica, calcium carbonate and talc, and/or organic filler components, a non-limited example of which includes jute, husk, and hemp.

It will be appreciated that while the cargo management system has been exemplified in the cargo compartment of a sport utility vehicle, it may equally be applied to other vehicle formats, such as van/minivans and sedans. The will be further appreciated that the cargo management system may be applied in cargo compartments of non-road use vehicles, such as marine-craft and/or aircraft.

It should be noted that in the description, terms such as forward, front and derivations of these terms are intended to mean or refer to an orientation directed towards, or a location situated towards the front of the vehicle. Similarly, terms such as rearward, rearmost, rear and derivations of these terms are intended to mean or refer to an orientation directed towards, or a location situated towards the back of the vehicle.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-descried exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

The invention claimed is:

1. A cargo management system for a vehicle comprising:
   at least one panel assembly having a first panel and a second panel, the first panel and the second panel being articulable about at least one hinge situated therebetween, the first panel having an attachment end for engagement with an interior trim panel of the vehicle, the second panel having a latch end for latching and/or locking the panel assembly in a desired configuration, wherein the second panel has a first deployed position in which the latch end of the second panel engages with a rear surface of a passenger seat such that the panel assembly forms an L-shaped deployed configuration, and wherein the second panel has a second deployed position in which the latch end of the second panel engages with an opposing interior trim panel of the vehicle such that the panel assembly forms a fully extended deployed configuration, wherein the latch end of the second panel is configured to engage and lock the panel assembly in each of the L-shaped and fully extended deployed configurations, and wherein the panel assembly is configured to be folded when in a stowed configuration, and recessed within the interior trim panel.

2. The cargo management system according to claim 1, wherein each of the first and second panels is planar and has a square or rectangular shape.

3. The cargo management system according to claim 1, wherein at least one of the first and second panels is formed with a peripheral frame having a central cut-out and one or more cross-elements positioned therein to obstruct objects from passing therethrough.

4. The cargo management system according to claim 3, wherein the one or more cross-elements are configured to receive functional convenience elements.

5. The cargo management system according to claim 4, wherein the functional convenience elements may include hooks, retainers, a roll out trunk cover or a retractable cargo net.

6. The cargo management system according to claim 1, wherein the attachment end of the first panel is provided with slide pins that cooperate with a track provided on the interior trim panel of the vehicle, the slide pins being permitted to slide within the track to permit arrangement of the panel assembly in one of the deployed or stowed configurations.

7. The cargo management system according to claim 1, wherein the latch end of the second panel is provided with hardware to enable locking of the second panel into a fixed position thereby holding the panel assembly in one of the deployed or stowed configurations.

8. The cargo management system according to claim 1, wherein the at least one panel assembly is two panel assemblies with respective attachment ends of the first panels being situated on the opposing interior trim panels in a cargo compartment of the vehicle.

9. The cargo management system according to claim 1, wherein the panel assembly is formed of a thermoplastic material selected from group consisting of polypropylene, polyethylene, acrylonitrile butadiene styrene (ABS), polycarbonate-acrylonitrile butadiene styrene (ABS/PC), polyamide, polylactic acid (PLA) and polyphenylene sulfide (PPS).

10. The cargo management system according to claim 9, additionally comprising inorganic and/or organic filler components.

11. The cargo management system according to claim 1, wherein the panel assembly is blow molded.

12. The cargo management system according to claim 1, wherein the panel assembly is injection molded.

13. The cargo management system according to claim 12, wherein the panel assembly is formed as two half-shells and fused together.

* * * * *